March 7, 1933.  H. T. SEELEY  1,900,589
CONTROL SYSTEM
Filed Sept. 26, 1931
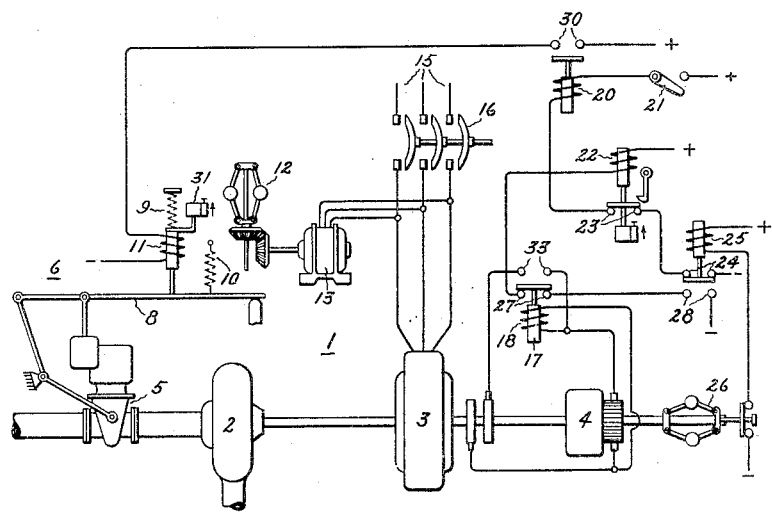
Inventor:
Harold T. Seeley,
by Charles E. Fuller
His Attorney.

Patented Mar. 7, 1933

1,900,589

UNITED STATES PATENT OFFICE

HAROLD T. SEELEY, OF YEADON, PENNSYLVANIA, ASSIGNOR TO GENERAL ELECTRIC COMPANY, A CORPORATION OF NEW YORK

CONTROL SYSTEM

Application filed September 26, 1931. Serial No. 565,310.

My invention relates to control systems and particularly to control systems for prime mover dynamo-electric plants and one of its objects is to provide an improved arrangement for preventing a prime mover from accelerating to an abnormally high speed due to a failure of the source of excitation for the generator of the plant.

My invention is especially adapted for use in prime mover dynamo-electric plants in which the speed of the prime mover is controlled by means of a flyball governor, the flyballs of which are driven by an electric motor energized from the generator of the plant. With such an arrangement, failure of the generator excitation causes a failure of the generator voltage so that the speed governor is rendered inoperative to maintain the speed of the prime mover at the desired value. In accordance with my invention I provide an improved arrangement whereby the prime mover is automatically shut down under such abnormal operating conditions.

My invention will be better understood from the following description when taken in connection with the accompanying drawing, the single figure of which diagrammatically illustrates a control system for a prime mover dynamo-electric plant embodying my invention and its scope will be pointed out in the appended claims.

Referring to the drawing, 1 represents a prime mover dynamo-electric plant comprising a water wheel 2 driving an alternating current generator 3 and an exciter 4. The supply of fluid energy to the water wheel 2 may be controlled by any suitable means such as a gate 5 which, in turn, is controlled by a suitable governing means 6 which, in the drawing, comprises a motor driven flyball governor having a movable member 8 which is arranged in any suitable manner, examples of which are well known in the art, so that the position thereof determines the opening of the gate 5. As diagrammatically shown in the drawing, the movable member 8 is in the gate closed position and is held in that position by a closing spring 9 against the bias of an opening spring 10 as long as the magnet 11 is deenergized. When it is desired to place the prime mover plant 1 in operation, it is necessary to energize the magnet 11 which is so arranged that its energization moves the closing spring 9 out of operative relation with the member 8 and allows the opening spring 10 to move the member 8 to a gate opening position. As long as the magnet 11 is energized, the gate opening position of the member 8 depends upon the position of the flyballs 12 which are driven by an electric motor 13 energized from the generator 3.

The generator 3 is arranged to be connected to a load circuit 15 by suitable switching means 16 and the exciter 4 is arranged to be connected to the field winding of the generator 3 by suitable switching means 17. The operation of the switching means 16 and 17 may be effected in any suitable manner, either automatically or manually, examples of which are well known in the art. As shown in the drawing, the switching means 16 is manually controlled and the switching means 17 is arranged to be closed by an operating winding 18 which is responsive to the exciter voltage so that the switching means 17 is closed when the exciter voltage is above a predetermined value.

The magnet 11 is controlled by a master relay 20 so that an energizing circuit is completed for the magnet 11 when the master relay 20 is energized and the magnet 11 is deenergized when the master relay 20 is deenergized.

In order to effect the starting of the plant, a suitable control switch 21 is provided, the operation of which may be effected in any suitable manner. As shown in the drawing, the switch 21 is manually controlled.

In order to prevent the prime mover 2 from running away in case the exciter voltage fails for any reason and renders the speed governor 12 inoperative to regulate the speed of the prime mover 2, I provide, in accordance with my invention, a lockout relay 22 which is controlled in accordance with the speed of the prime mover and the exciter voltage so that it effects the interruption of the circuits of the master relay 20 and the governor magnet 11 in case the speed of the prime mover remains above a predetermined abnormally high value for a predetermined time while the exciter voltage is below a predetermined value. In the particular embodiment of my invention shown in the drawing, this result is accomplished by including in the circuit of the master relay 20 the normally closed contacts 23 of the lockout relay 22 and the contacts 24 of an auxiliary relay 25 which is controlled by a suitable speed responsive device 26 so that the contacts 24 are closed when the speed of the prime mover 2 is below a predetermined value, and by including in the energizing circuit of the lockout relay 22 the contacts 27 of the exciter voltage responsive device 17 and the contacts 28 of the auxiliary relay 25 so that the relay 22 is energized to open its contacts 23 only when the prime mover speed is above a predetermined value and the exciter voltage is below a predetermined value. The lockout relay 22 is arranged in any suitable manner, examples of which are well known in the art, so that after they are opened, the contacts 23 are maintained in their open position independently of the subsequent deenergization of the relay.

The operation of the arrangement shown in the drawing is as follows: When it is desired to start the prime mover plant 1, control switch 21 is closed to complete an energizing circuit for the master relay 20 through the normally closed contacts 23 of the lockout relay 22 and the contacts 24 of the energized auxiliary relay 25. The master relay 20, by closing its contacts 30, completes an energizing circuit for the governor magnet 11 which moves the closing spring 9 out of operative relation with the movable member 8 of the governor 6 so that the opening spring 11 moves the member 8 to a gate opening position. If desirable, the opening movement of the member 8 may be retarded in any suitable manner, such as by means of a dash pot 31. The governor 6 continues to open the gate 5 until the water wheel 2 starts and the speed thereof reaches a value sufficient to cause the exciter voltage to build up, at which time the exciter voltage responsive device 17 operates to close its contacts 33 and open its contacts 27. The closing of the contacts 33 connects the field winding of the generator 3 across the exciter so that the generator voltage builds up and energizes the motor 13 driving the flyballs 12. The motor 13 comes up to speed quickly so that the flyballs 12 thereafter control the position of the movable member 8 to maintain the speed of the prime mover 2 at the desired value. The exciter voltage responsive device 17 by opening its contacts 27 interrupts the circuit of the lockout relay 22, which is also interrupted at the contacts 28 of the energized relay 25.

When it is desired to shut down the plant 1, the control switch 21 is opened so as to effect the deenergization of the master relay 20 and governor magnet 11. The closing spring 9 is thereby rendered operative to restore the movable member 8 to its gate closed position.

In case the exciter voltage fails to build up, during the starting operation of the plant, the opening movement of the governor is not limited by the flyballs 12 since the generator voltage does not build up. Therefore, the speed of the prime mover increases to an abnormally high value. As soon as the speed of the prime mover receives a predetermined abnormal value, the speed responsive device 26 opens its contacts and deenergizes the auxiliary relay 25 so that it opens its contacts 24 and closes its contacts 28. By opening its contacts 24, the relay effects the deenergization of the master relay 20 and the governor magnet 11 so as to effect the shutting down of the plant 1. By closing its contacts 28 the auxiliary relay 25 completes an energizing circuit for the lockout relay 22 through the contacts 27 of the deenergized exciter voltage responsive device 17 so that after a predetermined time the lockout relay 22 opens its contacts 23 in the circuit of the master relay 20. Since these contacts are held in their open position, it will be seen that the master relay 20 cannot be energized again to restart the plant until the contacts 23 have been manually reset. Although the relay 25 interrupts the circuit of the master relay 20 before the lockout relay 22 opens its contacts 23, the time delay setting of the relay 22 is so short that this relay has time to open its contacts 23 before the governor 6 can operate to decrease the prime mover speed to a value which will cause the speed responsive means to close its contacts.

While I have, in accordance with the Patent Statutes, shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States is:

1. In combination, a generator, a prime mover driving said generator, an exciter for said generator, means including a magnet for effecting the operation of said prime mover when said magnet is energized and for shutting down said prime mover when said magnet is deenergized, control means for normally effecting the energization and deenergization of said magnet, and means controlled by the speed of said prime mover and the voltage of said exciter for effecting the deenergization of said magnet and for removing it from the control of said control means when the speed of said prime mover exceeds a predetermined value while the exciter voltage is below a predetermined value.

2. In combination, a generator, a prime mover driving said generator, an exciter for said generator, means including a magnet for effecting the operation of said prime mover when said magnet is energized and for shutting down said prime mover when said magnet is deenergized, a circuit for said magnet, contacts in said magnet circuit, and means jointly controlled by the speed of said prime mover and the voltage of said exciter for opening said contacts when prime mover speed exceeds a predetermined value while the exciter voltage is below a predetermined value.

3. In combination, a generator, a prime mover driving said generator, an exciter for said generator, means including a magnet for effecting the operation of said prime mover when said magnet is energized and for shutting down said prime mover when said magnet is deenergized, a circuit for said magnet, a lockout relay controlling contacts in said magnet circuit, a circuit for said lockout relay, and means responsive to a predetermined overspeed of said prime mover and to an exciter voltage below a predetermined value for effecting the energization of said lockout relay to effect the opening of the contacts in said magnet circuit.

4. In combination, a generator, a prime mover driving said generator, an exciter for said generator, means including a magnet for effecting the operation of said prime mover when said magnet is energized and for effecting the shutting down of said prime mover when said magnet is deenergized, and means responsive to a predetermined speed above normal of said prime mover and to an exciter voltage below a predetermined value for maintaining said magnet permanently deenergized.

5. In combination, a generator, a prime mover driving said generator, an exciter for said generator, means including a magnet for effecting the operation of said prime mover when said magnet is energized and for effecting the shutting down of said prime mover when said magnet is deenergized, a circuit for said magnet, a lockout relay having normally closed contacts controlling said magnet circuit, means for maintaining said relay contacts open after they have been opened, and means responsive to a predetermined overspeed of said prime mover and to an exciter voltage below a predetermined value for effecting the energization of said relay to open its normally closed contacts.

In witness whereof, I have hereunto set my hand.

HAROLD T. SEELEY.